Patented Nov. 27, 1951

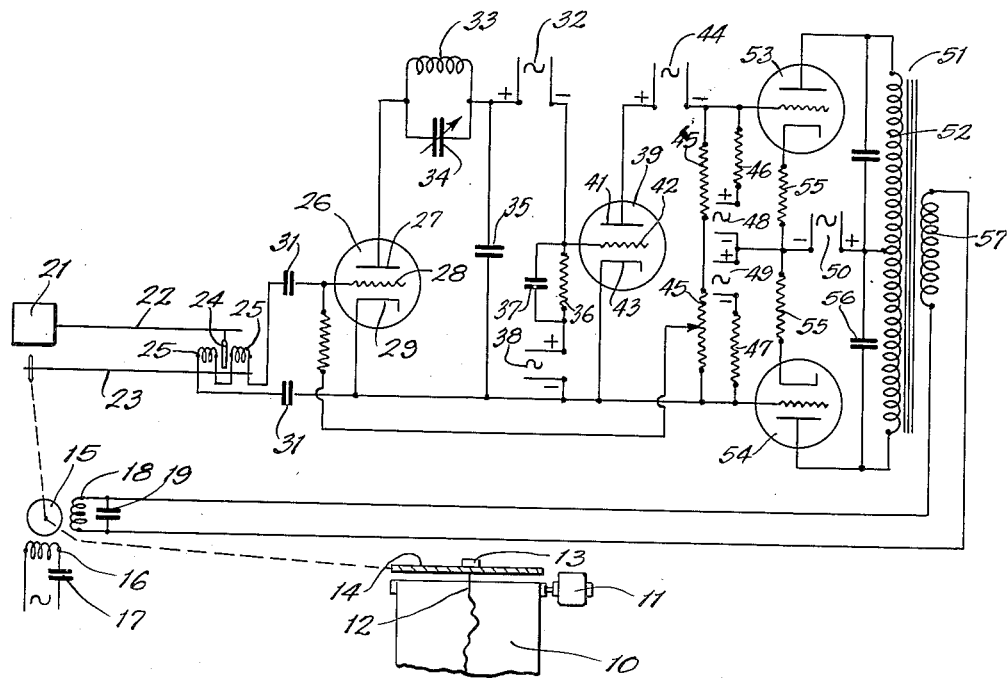

2,576,611

UNITED STATES PATENT OFFICE 2,576,611

APPARATUS FOR MEASURING PHYSICAL CONDITIONS

Karl A. Lang, Glenview, and John F. Cross, Franklin Park, Ill., assignors to Wheelco Instruments Company, Chicago, Ill., a corporation of Illinois Application November 18, 1947, Serial No. 786,678

7 Claims. (Cl. 318—31)

This invention relates to measuring apparatus and more particularly to instruments for recording and/or controlling variations in a physical condition such as temperature, pressure, flow, humidity, density and the like.

One of the objects of the invention is to provide a recorder in which a follow-up action is employed according to which a pointer moved in response to changes in the condition is followed by a lever moved by a motor controlled in response to changes in the relative positions of the pointer and lever to maintain the relative position of the pointer and lever the same.

Another object is to provide a recorder in which a reversible motor is controlled through an electrical system responsive to changes in impedance produced by the relative movement of a pointer and a lever.

Still another object is to provide a recorder in which an oscillator circuit controlled by changes in reactance produced by relative movement of a pointer and lever controls a reversible motor. Preferably, the reactance change is produced by parts movable adjacent each other but out of physical contact with each other carried by the pointer and lever respectively to vary the tuning of the oscillator.

A further object is to provide a recorder in which a reversible motor is controlled in response to the current flow in a circuit which in turn is controlled by varying the conductivity of a vacuum tube. In one desirable arrangement the current produces voltage drops opposed to voltages from external sources so that a change in the current changes the relative values of the drops and the sources to produce control voltages.

The above and other objects and advantages of the invention will be more readily apparent when read in connection with the accompanying drawing in which—

The single figure is a diagram of a recorder embodying the invention.

The recorder, as shown, is adapted to make a record on a strip chart indicated generally at 10 which is driven at constant speed by a motor 11. A pen 12 is movable across the chart to produce a record on the chart, the pen being carried by a carriage 13 into which a screw 14 is threaded. The screw is adapted to be turned to move the carriage by a reversible motor having a rotor 15 connected to the carriage. The motor, as shown, is a two phase rotating field motor having a power winding 16 supplied with current from a convenient alternating current source such as the usual sixty cycle supply line and having a condenser 17 in series with the winding to shift the phase of the current 90°. The direction of rotation of the motor is controlled by a control winding 18 having a condenser 19 connected thereacross and which is adapted to be supplied with current of the same phase as the source or of reverse phase to cause rotation in one direction or the other.

The motor is adapted to be controlled in response to changes in a condition which are sensed by an instrument 21 to produce movement of a pointer 22 proportional to changes in the condition. The instrument 21 may be an electrical instrument such as a millivoltmeter or may be a mechanical type instrument such as a pressure responsive bellows, a Bourdon tube or the like. Any instrument capable of producing movement of the pointer 22 in response to changes in the condition is satisfactory, and it is not intended to limit the invention to the use of any particular type of sensing instrument. A lever 23 is pivoted concentrically with the pointer 22 and is connected to the rotor 15 to be moved thereby. The pointer carries a metal flag 24 which is movable between adjacent induction coils 25 carried by the lever. Upon relative movement of the lever and pointer, the reactance of the induction coils will be changed as will be understood.

The variable impedance device formed by the coils and flag is adapted to vary the tuning of an oscillator including an electron discharge tube 26 having a plate 27, a grid 28, and a cathode 29. The grid and cathode are connected to opposite sides of the coils 25 through condensers 31 to provide a tuned input circuit for the oscillator. The plate is connected to a source of alternating current 32 through a tuned circuit including an inductance 33 and a condenser 34. The plate is connected to the cathode through a bypass condenser 35 and a load resistor 36 which is bypassed by a condenser 37. A second source of alternating voltage 38 is connected in circuit with the load resistor 36 and constitutes an additional source of plate supply voltage for the tube.

The output of the oscillator controls an amplifier including an electron discharge tube 39 having a plate 41, a grid 42 and a cathode 43. The grid-cathode circuit of the tube is connected across the load resistor 36 so that the amplifier tube is controlled by the oscillator output. The plate of the amplifier tube 39 is connected to an alternating voltage source 44 and across a pair of voltage divider resistances 45. Resistances 46 and 47 connected in series with alternating voltage sources 48 and 49 provide load resistors for the amplifier tube 39 and in addition form portions of a motor control circuit.

The motor control circuit includes a transformer 51 having a primary winding 52 which is center tapped and whose center is connected through an alternating voltage source 50 to the mid point between the resistors 46 and 47 and sources 48 and 49. The ends of the winding 52 are connected to the plates of motor control tubes 53 and 54. The cathodes of the tubes 53 and 54 are connected through biasing resistors 55 to one side of the source 50, and the grids of these tubes are connected to the outer sides of the resistors 46 and 47, respectively. Condensers 56 are connected across the upper and lower sections of the transformer primary windings to match the tube impedance to the motor impedance. The transformer has a secondary winding 57 which is connected to the control winding 18 of the motor, as shown. The lower resistor 45, as shown, is engaged by a wiper 58 which is connected to the grid 28 of the oscillator tube through a resistance 59 to provide an adjustable time constant or grid regulating circuit for the oscillator. The tuned input circuit for the oscillator is provided by the coils 25 and the grid to cathode capacitance and other capacitance in the input circuit. The tuning of this circuit is varied by relative movement of the pointer and lever which will produce a relative movement of the flag and coils to change their effective reactance. Feedback for sustained oscillations is obtained through the plate to grid capacitance of the tube 26.

In normal operation the flag 24 occupies a position substantially halfway into the coils 25 at which time the circuit is tuned to a partial resonance. In this condition of the oscillator circuit, a predetermined current will flow through the load resistor 36 to produce a predetermined bias on the grid 42 of the amplifier tube so that this tube will have a predetermined conductivity or impedance. At this time a current will flow through the resistors 46 and 47 to produce a voltage drop therein opposing the voltage of the sources 48 and 49 so that the voltage impressed on the grids of the tubes 53 and 54 approaches zero. At this time no voltage is generated in the secondary 57 of the transformer so that the motor is stationary.

If the pointer 22 moves in a direction to move the flag further into the pickup coils, the circuit is still oscillating but tends to deresonate. Under these conditions the oscillator plate current increases to increase the negative bias on the grid 42 of the amplifier tube so that the conductivity of this tube decreases or its impedance increases. This causes a reduction in the current flow through the resistors 46 and 47 to produce a negative bias on the tube 54 and a positive bias on the tube 53. The tube 53, therefore, conducts to produce a current flow from the source 50 through the tube 53 and the upper half of the transformer primary winding 52. This will produce a current of given phase in the motor control winding 18 to cause the motor to turn in a direction such that the coils will move away from the flag to reestablish the desired neutral relationship between the flag and coils.

If the pointer turns in a direction to move the flag 24 out of the pick up coils 25, the oscillator circuit approaches a condition of maximum resonance so that the current flowing through the load resistor 36 decreases. This decreases the negative bias on the grid 42 of the amplifier tube increasing its conductivity so that current flow through the resistors 46 and 47 increases. At this time the bias on the grid of the tube 53 becomes negative and that on the grid of the tube 54 becomes positive so that current will flow through the lower half of the transformer primary winding. This will cause a current of opposite phase to the first mentioned given current to be supplied to the control winding 18 of the motor so that the motor will run in the opposite direction to restore the balanced condition. It will be understood that operation of the motor moves the pen 12 to produce the desired record on the chart 10 and may further be utilized to provide a control operation, if desired.

In any case the position of the motor and of the pen is at all times a direct indication of the position of the pointer 22 which is in turn an indication of the condition to be recorded.

While one embodiment of the invention has been shown and described in detail herein, it will be understood that this is illustrative only and is not to be taken as a definition of the scope of the invention, reference being had for this purpose to the appended claims.

What is claimed is:

1. A measuring apparatus comprising a movable pointer, means responsive to a condition to be measured to move the pointer, a lever movable adjacent the pointer, a reversible motor connected to the lever to move it, an oscillator circuit, elements carried by the pointer and the lever and connected to the oscillator circuit to vary the tuning of the oscillator in accordance with changes in the relative positions of the pointer and lever, a transformer having a pair of primary windings and a secondary winding, the secondary winding being connected to the motor to control the direction of the motor in accordance with the phase of the current supplied thereto, the primary windings being so wound that the phase of the secondary current will be reversed when the different primary windings are energized, switch means to control the primary windings, and means responsive to the oscillator output to control the switch means.

2. A measuring apparatus comprising a movable pointer, means responsive to a condition to be measured to move the pointer, a lever movable adjacent the pointer, a reversible motor connected to the lever to move it, an oscillator circuit, elements carried by the pointer and the lever and connected to the oscillator circuit to vary the tuning of the oscillator in accordance with changes in the relative positions of the pointer and lever, a transformer having a pair of primary windings and a secondary winding, the secondary winding being connected to the motor to control the direction of the motor in accordance with the phase of the current supplied thereto, the primary windings being so wound that the phase of the secondary current will be reversed when the different primary windings are energized, a pair of electron discharge tubes connected to the primary windings respectively, and means responsive to the output of the oscillator circuit to control the tubes.

3. A measuring apparatus comprising a movable pointer, means responsive to a condition to be measured to move the pointer, a lever movable adjacent the pointer, a reversible motor connected to the lever to move it, an oscillator circuit, elements carried by the pointer and the lever and connected to the oscillator circuit to vary the tuning of the oscillator in accordance with changes in the relative positions of the pointer and lever, a transformer having a pair of primary windings and a secondary winding, the secondary winding being connected to the motor to control the direction of the motor in accordance with the phase of the current supplied thereto, the primary windings being so wound that the phase of the secondary current will be reversed when the different primary windings are energized, a pair of electron discharge tubes having their plate circuits connected to the primary windings respectively and having their grid circuits interconnected, and connections from the oscillator circuit across the interconnected grid circuits so that one tube will conduct when the oscillator varies in one direction from normal and the other tube will conduct when the oscillator varies in the other direction from normal.

4. A measuring apparatus comprising a movable pointer, means responsive to a condition to be measured to move the pointer, a lever movable adjacent the pointer, a reversible motor connected to the lever to move it, an oscillator circuit, elements carried by the pointer and the lever and connected to the oscillator circuit to vary the tuning of the oscillator in accordance with changes in the relative positions of the pointer and lever, a transformer having a pair of primary windings and a secondary winding, the secondary winding being connected to the motor to control the direction of the motor in accordance with the phase of the current supplied thereto, the primary windings being so wound that the phase of the secondary current will be reversed when the different primary windings are energized, a pair of electron discharge tubes each having a plate and a grid, the plates being connected to the primary windings respectively, a connection between the grids, and connections from opposite sides of the oscillator output circuit to the grids respectively so that the tubes will alternately conduct as the oscillator output rises above and falls below normal.

5. A measuring apparatus comprising a movable pointer, means responsive to a condition to be measured to move the pointer, a lever movable adjacent the pointer, a reversible motor connected to the lever to move it, an oscillator circuit, elements carried by the pointer and the lever and connected to the oscillator circuit to vary the tuning of the oscillator in accordance with changes in the relative positions of the pointer and lever, a transformer having a pair of primary windings and a secondary winding, the secondary winding being connected to the motor to control the direction of the motor in accordance with the phase of the current supplied thereto, the primary windings being so wound that the phase of the secondary current will be reversed when the different primary windings are energized, a pair of electron discharge tubes each having a plate, a grid and a cathode, each plate being connected to an end of one of the primary windings, the other ends of the primary windings having a common connection to the cathodes through a source of alternating voltages, resistors connecting the grids respectively through sources of alternating voltage to the common connection, and connections from opposite sides of the oscillator output circuit to the grids respectively.

6. A measuring apparatus comprising a movable pointer, means responsive to a condition to be measured to move the pointer, a lever movable adjacent the pointer, a reversible motor connected to the lever to move it, a variable reactance device including a pair of relatively movable parts, one of which is carried by the pointer and the other by the lever, an electron discharge tube, means controlled by the variable reactance device to control the tube to vary its conductivity, a circuit connected across the tube including a pair of resistors in series and a voltage source for each resistor, a transformer having a primary winding connected at its center to a point in the circuit between the resistors, a pair of electron discharge tubes having their plates connected respectively to the ends of the primary winding, grids in the tubes connected respectively to the circuit on opposite sides of the resistors, and a secondary winding on the transformer connected to the motor to control it.

7. A measuring apparatus comprising a movable pointer, means responsive to a condition to be measured to move the pointer, a lever movable adjacent the pointer, a reversible motor connected to the lever to move it, a variable reactance device including a pair of relatively movable parts, one of which is carried by the pointer and the other by the lever, an oscillator having a tuned output circuit and a tuned input circuit including said device whereby the operation of the oscillator is controlled by the relative position of the parts, an electron discharge tube having its grid connected to the oscillator output circuit to vary the conductivity of the tube in response to the condition of the oscillator, a circuit connected across the tube including a pair of resistors in series and a voltage source for each resistor, a transformer having a primary winding connected at its center to a point in the circuit between the resistors, a pair of electron discharge tubes having their plates connected respectively to the ends of the primary winding, grids in the tubes connected respectively to the circuit on opposite sides of the resistors, and a secondary winding on the transformer connected to the motor to control it.

KARL A. LANG.
JOHN F. CROSS.

REFERENCES CITED

The following references are of record in the file of this patent:

UNITED STATES PATENTS

| Number | Name | Date |
| --- | --- | --- |
| 1,838,084 | Drake | Dec. 29, 1931 |
| 2,228,163 | Cohen | Jan. 7, 1941 |
| 2,346,838 | Haight | Apr. 18, 1944 |
| 2,354,945 | Cohen et al. | Aug. 1, 1944 |
| 2,414,314 | Machlett | Jan. 14, 1947 |
| 2,437,661 | Coake | Mar. 9, 1948 |
| 2,473,494 | Wannamaker | June 14, 1949 |
| 2,517,556 | Goertz | Aug. 8, 1950 |
| 2,527,797 | Cohen | Oct. 31, 1950 |

FOREIGN PATENTS

| Number | Country | Date |
| --- | --- | --- |
| 750,075 | France | Aug. 3, 1933 |